(12) United States Patent
Higuchi et al.

(10) Patent No.: US 9,845,015 B2
(45) Date of Patent: Dec. 19, 2017

(54) VEHICLE BODY STRUCTURE OF AUTONOMOUS VEHICLE

(71) Applicant: Sharp Kabushiki Kaisha, Osaka (JP)

(72) Inventors: Atsushi Higuchi, Osaka (JP); Kyosuke Taka, Osaka (JP); Tetsushi Ito, Osaka (JP); Masatoshi Tomomasa, Osaka (JP); Kosuke Tanaka, Osaka (JP); Kiyotaka Hirata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/171,255

(22) Filed: Jun. 2, 2016

(65) Prior Publication Data
US 2016/0355092 A1 Dec. 8, 2016

(30) Foreign Application Priority Data

Jun. 4, 2015 (JP) .................................. 2015-113769
Feb. 29, 2016 (JP) .................................. 2016-037320

(51) Int. Cl.
*B60L 11/18* (2006.01)
*B62D 21/02* (2006.01)

(52) U.S. Cl.
CPC .............. *B60L 11/18* (2013.01); *B62D 21/02* (2013.01)

(58) Field of Classification Search
CPC ......... B60K 17/10; B60K 17/05; B60L 11/18; B62D 39/00
See application file for complete search history.

(56) References Cited

U.S. PATENT DOCUMENTS

2017/0050517 A1* 2/2017 Higuchi ............... B60K 17/354

FOREIGN PATENT DOCUMENTS

JP 2013-244896 12/2013

* cited by examiner

*Primary Examiner* — John Walters
*Assistant Examiner* — James Triggs
(74) *Attorney, Agent, or Firm* — Renner, Otto, Boisselle & Sklar, LLP

(57) ABSTRACT

A vehicle body structure of an autonomous vehicle includes: a first driver integrally configured of a drive portion for a first wheel, a drive shaft for the first wheel and a first shaft support for the drive shaft; a second driver integrally configured of an axle for a second wheel and a second shaft support for the axle; and, a pair of side frames arranged on each side in a width direction of the chassis and each extended in a front-to-rear direction of the chassis to support the first driver and the second driver. The first shaft support and the second shaft support each have an attachment part to be fixed to a flank of the side frame from an outside. Each of the first and second drivers is integrally attached to, and detached from, the side frame, by access from the flank of the side frame.

15 Claims, 9 Drawing Sheets

VEHICLE BODY STRUCTURE OF AUTONOMOUS VEHICLE

This Nonprovisional application claims priority under 35 U.S.C. §119(a) on Patent Application No. 2015-113769 filed in Japan on 4 Jun. 2015 and No. 2016-037320 filed in Japan on 29 Feb. 2016, the entire contents of which are hereby incorporated by reference.

BACKGROUND OF THE INVENTION

(1) Field of the Invention

The present invention relates to a vehicle body structure of an autonomous vehicle, in particular relating to a vehicle body structure of an autonomous vehicle that travels on wheels attached to the chassis.

(2) Description of the Prior Art

Conventionally, there has been a knows autonomous vehicle that has two wheels arranged in the longitudinal direction on each side, the two wheels being coupled by a drive transmitting means to drive.

Since the drive system of the aforementioned autonomous vehicle has one drive unit including a power source, a power transmitting means, and another drive unit, integrally installed therein, it has been very difficult to perform maintenance of the two drive units and power transmitting means.

To deal with this, a disclosure of a crawler type driving mechanism having crawlers arranged in the longitudinal direction of the vehicle has been proposed in which the crawlers are constructed so as to be removable from the vehicle frame to thereby achieve improved maintenance performance.

PRIOR ART DOCUMENTS

Patent Documents

Patent Document1

Japanese Patent Application Laid-open No. 2013-244896

OUTLINE OF THE INVENTION

Problems to be Solved by the Invention

Recently, many autonomous vehicles have tended to adopt skid-steer drive because this system downsizes the vehicle configuration compared to those adopting crawler type driving mechanisms and still enables steering and turning at a fixed a point without needing a large steering space, by actuating the left and right wheels at different rates of revolutions.

However, because, in the skid-steer drive, the drive units including the axles (drive shafts) of the driving tires receive a strong burden, there is a problem that more frequent maintenance is needed than that for the vehicle adopting crawler type driving mechanism. To solve this problem, there have been demands for simplification of maintenance of the drive units.

In status quo, usually the axles are directly supported by the chassis frame (side frames). In maintaining the drive unit of this arrangement, it is necessary to access the interior of the chassis frame.

Further, in the aforementioned case, usually some structure for achieving vehicle's certain purposes is mounted on the top of the chassis frame. Therefore, when maintenance of the drive units is performed, it is necessary to remove the structure arranged on the top of the chassis frame.

SUMMARY OF THE INVENTION

In view of the above problems, it is therefore an object of the present invention to provide a vehicle body structure of an autonomous vehicle that is excellent in maintenance performance.

In order to achieve the above object, the vehicle body structure of an autonomous vehicle according to the present invention is configured as follows:—

According to the present invention, a vehicle body structure of an autonomous vehicle that travels on wheels attached to a chassis, includes: a first driver integrally configured of a drive portion for driving a first wheel, a drive shaft for driving the first wheel and a first shaft support that rotatably supports the drive shaft; a second driver integrally configured of an axle for supporting a second wheel and a second shaft support that rotatably supports the axle; a pair of side frames arranged on each side in a width direction of the chassis and each extended in a front-to-rear direction of the chassis to support the first driver and the second driver, and is constructed such that the first shaft support and the second shaft support each have an attachment part to be fixed to a flank of the side frame from an outside, the first driver can be integrally attached to, and detached from, the side frame, by access from the flank of the side frame, and, the second driver can be integrally attached to, and detached from, the side frame, by access from the flank of the side frame.

It is preferable that the first shaft support and/or the second shaft support is attached to the flank of the side frame by a fastener in a detachable manner so that the attachment part comes in surface contact with the flank of the side frame.

It is preferable that the first shaft support and/or the second shaft support has a top surface opposite to an undersurface of the side frame when mounted to the side frame, the undersurface locating over the first shaft support and/or the second shaft support, and, the first shaft support and/or the second shaft support having the top surface is placed so that the top surface comes in surface contact with the undersurface of the side frame.

It is preferable that the first shaft support and/or the second shaft support has a top surface opposite to an undersurface of the side frame when mounted to the side frame, the undersurface locating over the first shaft support and/or the second shaft support and, a buffer member for inhibiting vibration of the side frame in a vertical direction is arranged between the top surface of the first shaft support and/or the second shaft support and the undersurface of the side frame.

It is preferable that the first shaft support rotatably supports the drive shaft, at least, at two points on an axial line, and the second shaft support rotatably supports the axle, at least, at two points on an axial line.

It is preferable that the drive shaft of the first driver and the axle of the second driver are coupled by an endless member (endless belt), the first driver includes a first endless member driving part (pulley) for transmitting drive to the endless member, the second driver includes a second endless member driving part (pulley) that is driven by the endless member to drive the axle, the first endless member driving part is arranged on the drive shaft between part on a first wheel side and part on a drive portion side, and the second endless member driving part is arranged on the axle between part on a second wheel side and part on a far side of the second wheel.

It is preferable that the side frame includes a positioning part (guide hole) for positioning the first driver, and the first driver includes an engaging part (guide part) mating with the positioning part.

It is preferable that the shaft support has a hollow grip (that can be held by fingers) that is formed on an inner side surface of the chassis.

It is preferable that the drive portion includes a drive motor and a speed reducer, the drive motor and speed reducer are arranged in front and behind in a front-to-rear direction of the chassis.

It is preferable that the chassis has a power supply unit (e.g., a battery) mounted at a predetermined position, and, when the first driver is mounted on the chassis, the drive motor is set at a predetermined position adjacent to the power supply unit and electrically connected to the power supply unit so that power can be supplied to the drive motor.

It is preferable that the chassis includes an electric connector (drive control board) that electrically connects the power supply unit and the drive motor, the electric connector includes a power supply side electrode portion that is connected to the power supply unit and is connected to a drive motor side electrode portion, the drive motor includes the drive motor side electrode portion to be connected to the power supply side electrode portion, and, the power supply side electrode portion and the drive motor side electrode portion are connected by surface contact of a plane that extends in the width direction of the chassis.

Also, according to the present invention, a vehicle body structure of an autonomous vehicle that travels on wheels attached to a chassis, includes: a pair of side frames arranged on each side in a width direction of the chassis and each extended in a front-to-rear direction of the chassis; a first driver integrally configured of a drive portion for driving a first wheel and a drive shaft for driving the first wheel; and a second driver configured to rotatably support an axle for supporting a second wheel, wherein the drive shaft and the axle are rotatably supported, at least, at two points on respective axial lines, and the first driver and the second driver can be integrally attached to, and detached from, the same side frame, by access from a flank of the same side frame.

It is preferable that the vehicle body structure of the autonomous vehicle has a buffer member for inhibiting vibration of the side frame in a vertical direction is arranged between a top surface of the first driver and/or the second drive and the side frame.

It is preferable that the drive shaft of the first driver and the axle of the second driver are coupled by an endless member, the first driver includes a first endless member driving part for transmitting drive to the endless member, the second driver includes a second endless member driving part that is driven by the endless member to drive the axle, the first endless member driving part is arranged on the drive shaft between part on a first wheel side and part on a drive portion side, and the second endless member driving part is arranged on the axle between part on a second wheel side and part on a far side of the second wheel.

Advantages of the Invention

According to the vehicle body structure of the autonomous vehicle of the present invention, the first driver and the second driver are formed into individual units so that it is possible to attach and detach each of the units by allowing access from the outside of the side frame. As a result, in performing maintenance of the first driver and the second driver, it is possible to maintain each driver without the need of accessing the interior of the chassis as well as without being affected by the structures arranged on the top of the chassis. Accordingly, it is possible to provide a vehicle body structure of the autonomous vehicle excellent in maintenance performance.

DESCRIPTION OF THE PREFERRED EMBODIMENTS

The First Embodiment

Now, embodiments of vehicle body structures of autonomous vehicles of the present invention will be described with reference to the drawings.

Figure 1:
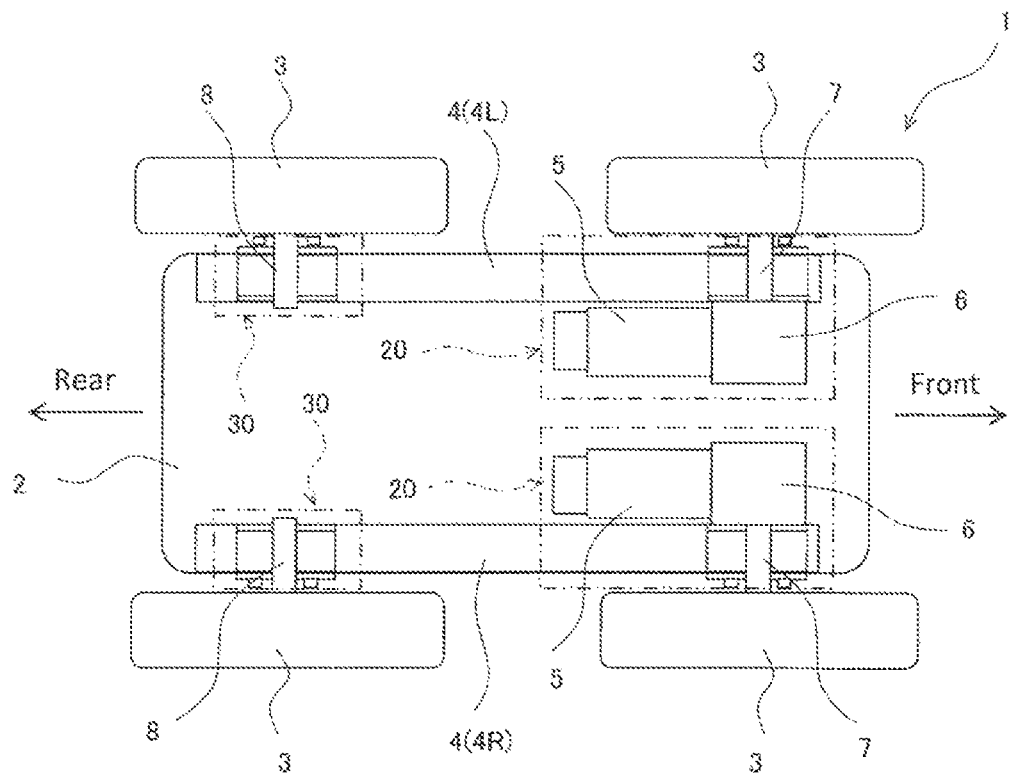
FIG. 1 is an illustrative diagram in a plan view showing an overall configuration of a vehicle body structure of an autonomous vehicle according to a first embodiment of the present invention.
Figure 2:
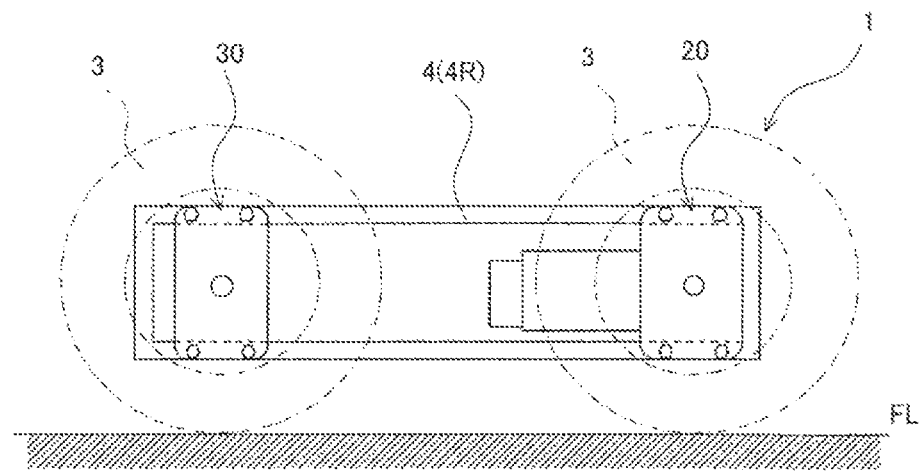
FIG. 2 is an illustrative diagram in a side view showing the overall configuration of the vehicle body structure of the autonomous vehicle.
Figure 3:
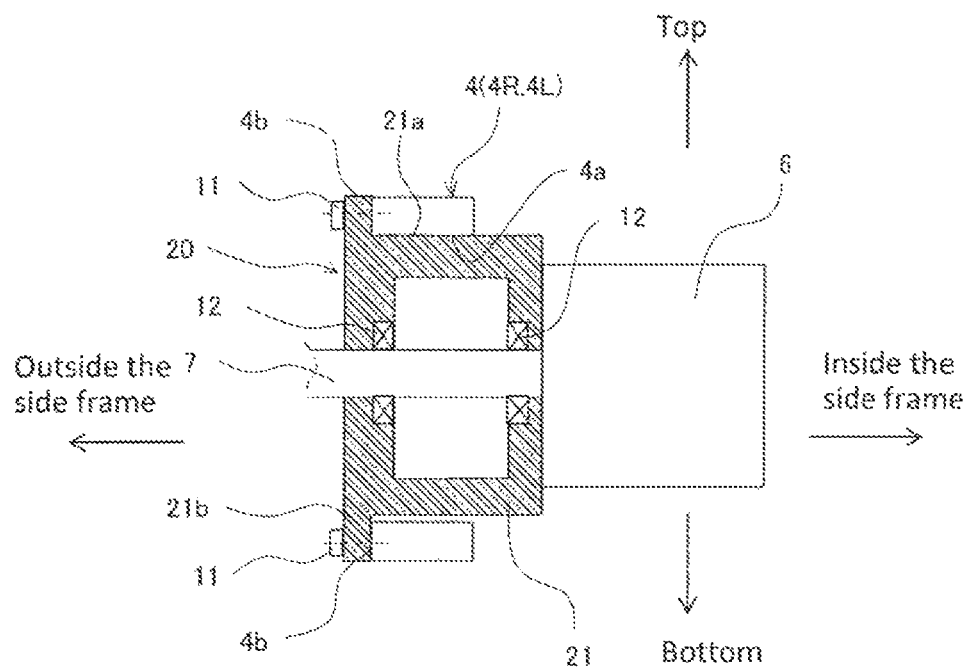
FIG. 3 is an illustrative diagram showing a mounted state of a side frame and a first drive unit that form the vehicle body structure of the autonomous vehicle.
Figure 4:
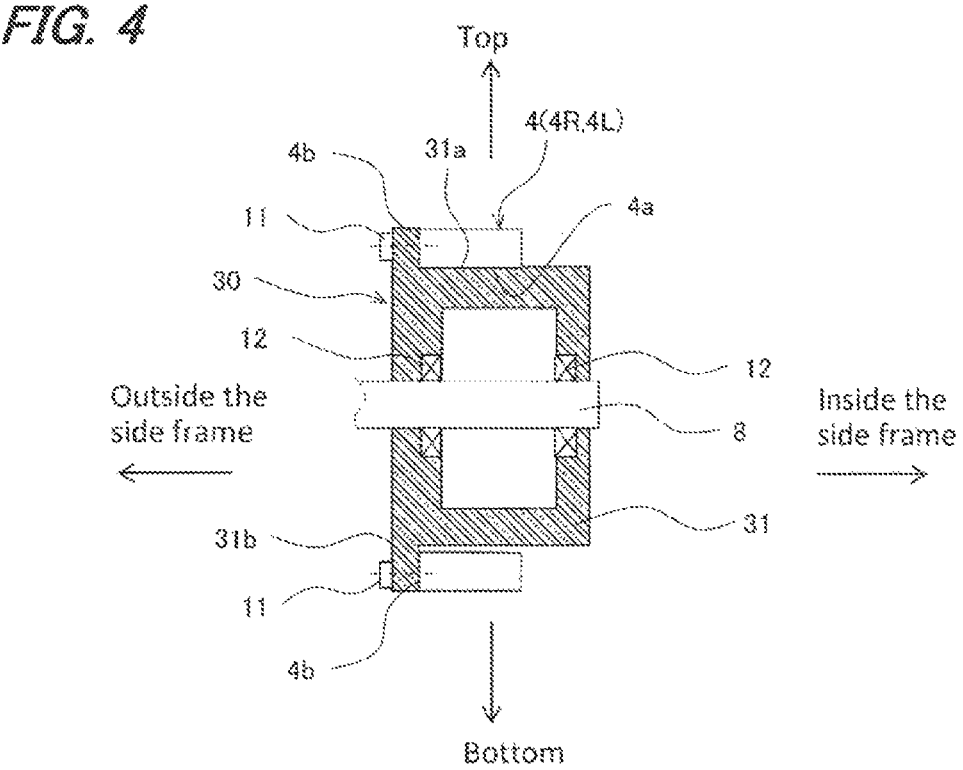
FIG. 4 is an illustrative diagram showing a mounted state of the side frame and a second drive unit that form the vehicle body structure of the autonomous vehicle.

FIG. 1 shows one example of an embodied mode of the present invention and is an illustrative diagram in a plan view showing an overall configuration of a vehicle body structure of an autonomous vehicle according to the first embodiment of the present invention; FIG. 2 is an illustrative diagram in a side view showing the overall configuration of the vehicle body structure of the autonomous vehicle; FIG. 3 is an illustrative diagram showing a mounted state of a side frame and a first drive unit that form the vehicle body structure of the autonomous vehicle; and, FIG. 4 is an illustrative diagram showing a mounted state of the side frame and a second drive unit that form the vehicle body structure of the autonomous vehicle.

A vehicle body structure 1 of an autonomous vehicle according to the first embodiment includes a chassis 2 equipped with wheels 3, as shown in FIG. 1. Meanwhile, in the present invention, each wheel can be defined as containing a tireless wheel and a tired wheel.

Herein, an autonomous vehicle is a device that autonomously travels on a mechanical or program basis without being controlled by human decision-making. A known example of the autonomous vehicle is an autonomous industrial truck for transporting some stuff in a factory.

The vehicle body structure 1 of the autonomous vehicle of the first embodiment includes a chassis 2, wheels 3, side frames 4 (4R, 4L), drive motors (driving part) 5 for driving wheels 3 (front wheels: the first wheels), speed reducers (drive transmitters) 6, drive shafts 7 for driving wheels 3 and axles 8 for supporting wheels 3 (rear wheels: the second wheels). In the present embodiment, the drive motors 5 are provided on the front wheel 3 side, but it goes without saying that the drive motors 5 may be provided on the rear wheel 3 side.

The configuration of the vehicle body structure 1 of the autonomous vehicle of the first embodiment will be described with reference to the drawings.

The chassis 2 that constitutes the vehicle body structure 1 of the autonomous vehicle is given in a rectangular form with its long side oriented in the front-to-rear direction of the chassis. A pair of side frames 4R and 4L extending in the front-to-rear direction of the chassis are arranged on each side in the width direction of the chassis.

The side frames 4R and 4L each may be configured by a tubular structural member having a rectangular cross-section, for example.

In the first embodiment, there are first drive units (first drivers) 20 (FIG. 2) each including a drive motor 5, speed reducer (e.g., gear box) 6 and drive shaft 7 as an integrated unit and second drive units (second drivers) 30 (FIG. 2) each including an integrated unit structure for rotatably supporting an axle 8. In FIGS. 1 and 2, wheels 3 have been mounted to the first drive units 20 and the second drive units 30. A reference numeral FL (FIG. 2) designates an indoor floor surface or outdoor ground surface.

The first drive unit 20 includes a drive shaft support box (shaft support) 21 for supporting the drive shaft 7 as shown in FIG. 3. In the drive shaft support box 21, the drive shaft 7 is rotatably supported by a pair of bearings 12 arranged on the wheel 3 side (the outer side of the side frame) and on the drive motor 5 side (the inner side of the side frame).

Attached to the drive shaft support box 21 is the speed reducer 6, integrally on the inner side of the opposing side frames 4R and 4L. The outside dimension of the speed reducer 6 in the vertical direction is made shorter than the outside dimension of the drive shaft support box 21.

The second drive unit 30 includes, as shown in FIG. 4, an axle support box 31 for supporting the axle 8. In the axle support box 31, the axle 8 is rotatably supported at two points by a pair of bearings 12 arranged on the wheel 3 side (the outer side of the side frame) and on the far side of the wheel (the inner side of the side frame).

As shown in FIGS. 1 and 2, the first drive unit 20 is provided so that from the outside of the chassis, all the members forming the first drive unit 20 can be integrally attached to and detached from the side frame 4R/4L.

Similarly, as shown in FIGS. 1 and 2, the second drive unit 30 is also provided so that from the outside of the chassis, all the members of the second drive unit 30 can be integrally attached to and detached from the side frame 4R/4L.

The side frames 4R and 4L each have a first mounting face 4a and a second mounting face 4b, as shown in FIGS. 3 and 4.

The first mounting face 4a is a downward facing attachment surface that comes in contact with the top surface (the first attachment part 21a: FIG. 3) of the drive shaft support box 21 and the top surface (the first attachment part 31a: FIG. 4) of the axle support box 31.

The second mounting face 4b is an attachment surface that comes in surface contact with the flange-shaped side surface (the second attachment part 21b: FIG. 3) of the drive shaft support box 21 and the flange-shaped side surface (the second attachment pare 31b: FIG. 4) of the axle support box 31.

With this arrangement, the drive shaft support box 21 and the axle support box 31 can be mounted to the side frame from the outside of the side frame chassis.

That is, the drive shaft support box 21 and the axle support box 31 have on their top surface the respective first attachment parts 21a and 31a that come into surface contact with the first mounting face 4a of the side frame 4R/4L, and have on their side portion the respective flange-shaped second attachment parts 21b and 31b that come into surface contact with the second mounting face 4b of the side frame 4R/4L.

The second attachment parts 21b and 31b are attached to the side face of the side frame 4 by means of fasteners 11.

As described above, the vehicle body structure 1 of the autonomous vehicle according to the first embodiment includes a pair of side frames 4R and 4L arranged on each side in the width direction of the chassis and extended in the front-to-rear direction of the chassis, the first drive units 20 each having a drive motor 5, speed reducer 6 and drive shaft 7 integrally provided as a unit and the second drive units 30 each having an axle 8 rotatably supported and integrally provided as a unit. The first drive unit 20 and second drive unit 30 are arranged so as to be integrally attached in a detachable manner to the same side frame 4R/4L. The first drive unit 20 includes the drive shaft support box 21 supporting the drive shaft 7 while the second drive unit 30 includes the axle support box 31 supporting the axle 8. The drive shaft support box 21 and the axle support box 31 have second attachment part 21b and 31b, respectively, on their side portion, that come in surface contact with the side face of the side frame 4R/4L. Accordingly, it is possible to positively fix and easily detach each unit (in the axial direction of the drive shaft 7) from the outside of the chassis or the outer side of side frame 4R/4L.

According to the first embodiment, the first drive unit 20 is configured so that the drive shaft 7 is rotatably supported by a pair of bearings 12 on the wheel 3 side and on the drive motor 5 side in the drive shaft support box 21 while the second drive unit 30 is configured so that the axle 8 is rotatably supported at two points by a pair of bearings 12 on the wheel 3 side and on the far side of the wheel in the axle support box 31, whereby the first drive unit 20 and the second drive unit 30 are each configured integrally (as a unit), and the wheel 3 in each unit can be stably supported at the double support structure.

In this way, according to the vehicle body structure 1 of the autonomous vehicle according to the first embodiment, in maintaining first drive units 20 and second drive units 30, it is possible to remove and maintain each of the first drive units 20 and second drive units 30 without the need of accessing the interior of the chassis 2 as well as without being affected by the structures arranged on the top of the chassis. Accordingly, it is possible to provide a vehicle body structure of an autonomous vehicle excellent in maintenance performance.

Further, in the first embodiment each of the side frames 4R and 4L is provided with the downward-facing first mounting face 4a that comes into surface contact with the top part of the drive shaft support box 21 of the first drive unit 20 and the top part of the axle support box 31 of the second drive unit 30 and the second mounting face 4b that comes into surface contact with the side part of the drive shaft support box 21 and the side part of the axle support box 31. The drive shaft support box 21 and the axle support box 31 are formed on their top portion with respective first attachment parts 21a and 31a that come into surface contact with the first mounting face 4a of the side frame 4R/4L and are formed on their side portion with respective second attachment parts 21b and 31b that come into surface contact with the second mounting face 4b of the side frame 4R/4L, so that the support boxes 21 and 31 can be attached (in the axial direction of the drive shaft 7) from the outside of chassis or the outer side of side frame 4R/4L. As a result, the drive shaft support box 21 and the axle support box 31 can be attached with their two surfaces of the top surface and the side surface put in surface contact with the side frame 4R/4L, hence reliably fixed without rattling.

Though, in the above embodiment, the drive shaft support box 21 and the axle support box 31 are both formed on their side portion with respective second attachment parts 21b and 31b that are put into surface contact with the side face of side frame 4R/4L, only one of the drive shaft support box 21 and the axle support box 31 may have the above configuration.

The Second Embodiment

Next, the second embodiment of the present invention will be describes with reference to the accompanying drawings.

Figure 5:
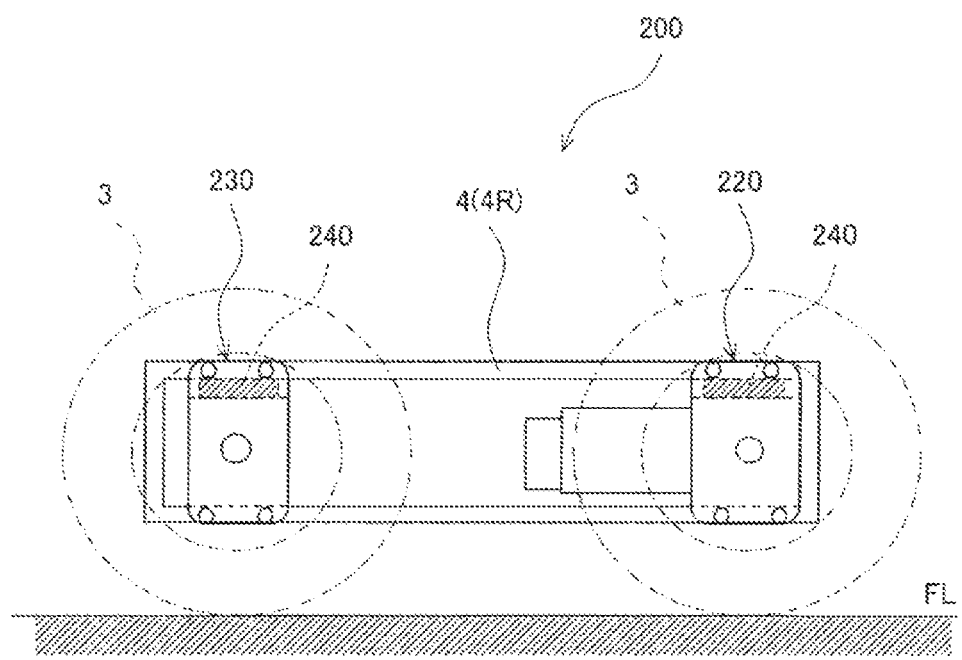
FIG. 5 is an illustrative diagram in a side view showing an overall configuration of a vehicle body structure of an autonomous vehicle according to a second embodiment of the present invention.
Figure 6:
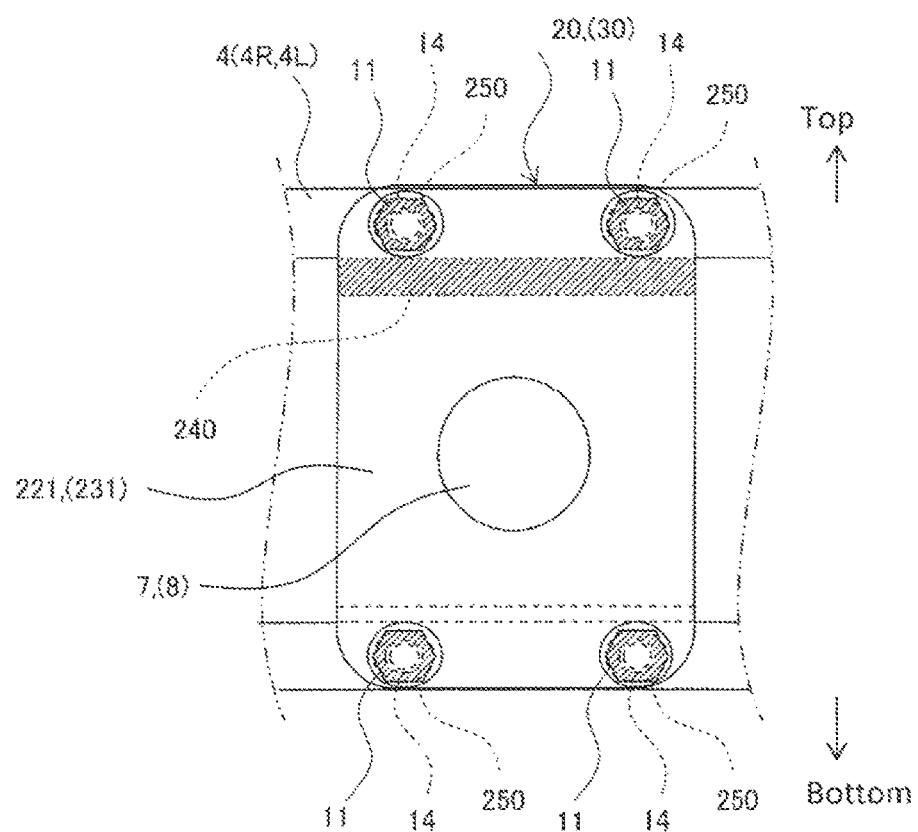
FIG. 6 is an illustrative diagram showing a state where a buffer member is arranged between a side frame and a first drive unit that form the vehicle body structure of the autonomous vehicle.

FIG. 5 is an illustrative diagram in a side view showing an overall configuration of a vehicle body structure of an autonomous vehicle according to the second embodiment of the present invention; FIG. 6 is an illustrative diagram showing a state where a buffer member is arranged between a side frame and a first drive unit that form the vehicle body structure of the autonomous vehicle; and, FIG. 7 is an illustrative diagram showing a state that the side frame, the first drive unit and the buffer member are mounted.

Here, in the vehicle body structure of the autonomous vehicle in the second embodiment, the same components as those of the vehicle body structure 1 of the autonomous vehicle of the first embodiment will be allotted with the same reference numerals without description.

A vehicle body structure 200 of the autonomous vehicle according to the second embodiment is characterized by provision of a buffer member 240 that inhibits vibration in the vertical direction of the side frame 4, between the top portion of a first drive unit 220 and the side frame 4R/4L and between the top portion of a second drive unit 230 and the side frame 4R/4L.

Figure 7:
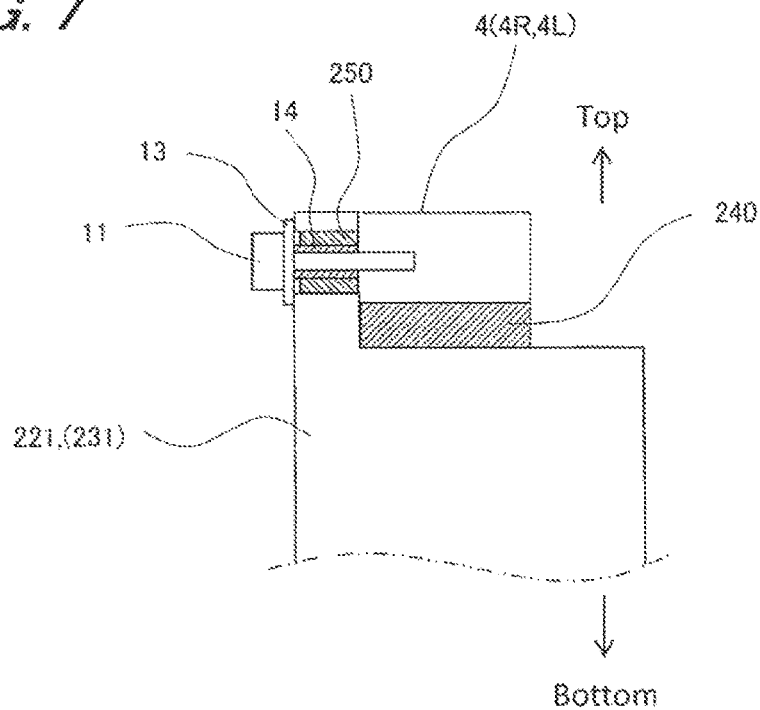
FIG. 7 is an illustrative diagram showing a mounted state of the side frame, the first drive unit and the buffer member.

The first drive unit 220 and the second drive unit 230 include a drive shaft support box 221 for supporting the drive shaft 7 and an axle support box 231 for supporting the axle 8, respectively, as shown in FIGS. 6 and 7.

The drive shaft support box 221 and the axle support box 231 each are attached to the side frame 4R/4L via a rubber bush 250 by means of fasteners 11 (FIG. 7).

Attachment of the drive shaft/axle support box 221/231 to the side frame 4R/4L is performed by inserting a collar 14 having a marginally longer (higher) than the thickness of attachment portion of the drive shaft/axle support box 221 and 231 and fixing with fasteners 11 (FIG. 7). This arrangement makes it possible to support the drive shaft/axle support box 221/231 via the rubber bush 250, instead of being fixed to the side frame 4R/4L.

As described above, the vehicle body structure 200 of a autonomous vehicle according to the second embodiment is configured such that the buffer members 240 for inhibiting vibration in the vertical direction of the side frame 4 are provided between the top portion of the first drive unit 220 and the side frame 4R/4L and between the top portion of second drive unit 230 and the side frame 4R/4L and that the drive shaft/axle support bores 221/231 are attached to the side frame 4R/4L via rubber bush 250. As a result, it is possible to inhibit the side frames 4R, and 4L from vibrating by means of the buffer members 240 even when the autonomous vehicle runs over rough terrain.

In the second embodiment, the first drive unit 220 and the second drive unit 230 are attached to the side frame 4R/4L by use of fasteners 11 and collar 14 so as not to fix the unit, but so as to support the unit via the rubber bush 250. However, the method of attachment to the side frame 4R/4L is not limited to this. That is, other methods may be used as long as the first drive unit 220 and the second drive unit 230 can be supported without being fixed to the side frame 4R/4L.

Though, in the second embodiment, the buffer member 240 and rubber bush 250 are provided for both the first drive unit 220 and the second drive unit 230, but may be provided for only one of the first drive unit 220 and the second drive unit 230.

The Third Embodiment

Next, the third embodiment of the present invention will be described with reference to the accompanying drawings.

Figure 8:
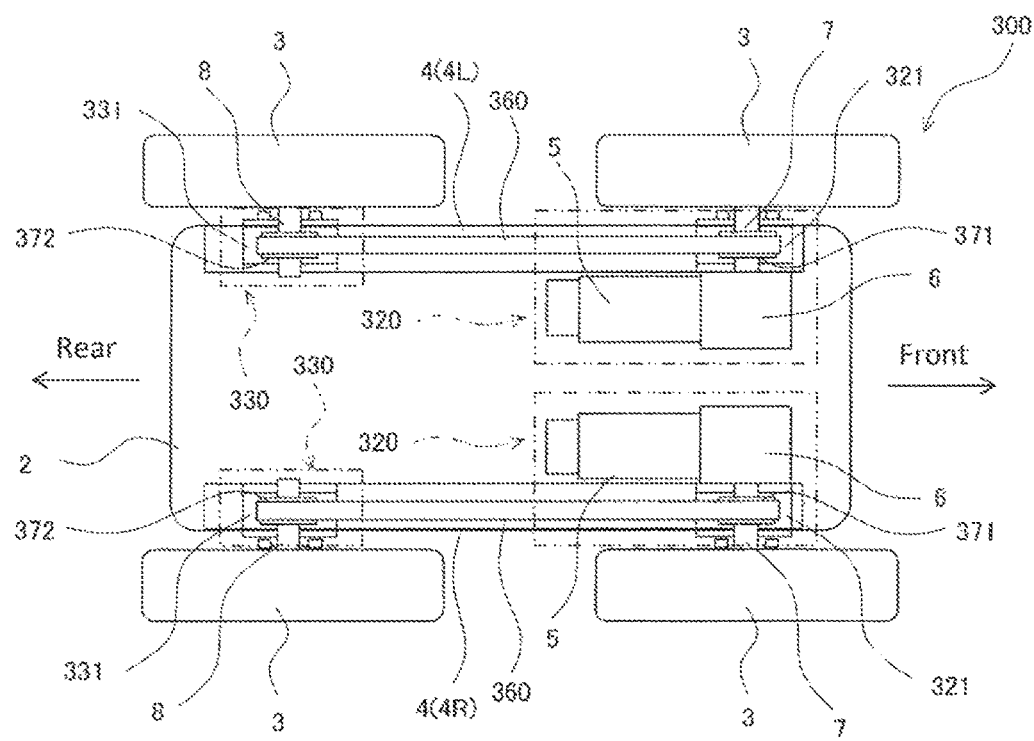
FIG. 8 is an illustrative diagram in a plan view showing an overall configuration of a vehicle body structure of an autonomous vehicle according to a third embodiment of the present invention.
Figure 9:
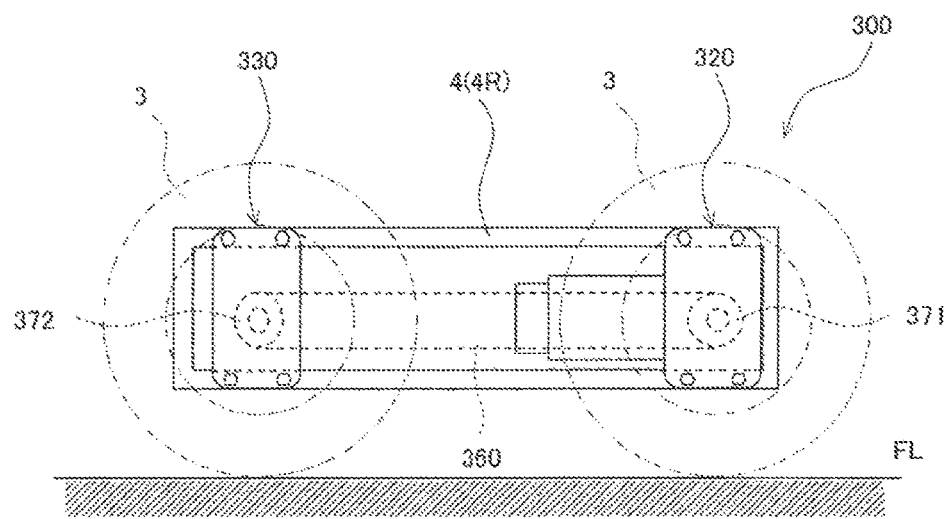
FIG. 9 is an illustrative diagram in a side view showing the overall configuration of the vehicle body structure of the autonomous vehicle.

FIG. 8 is an illustrative diagram in a plan view showing an overall configuration of a vehicle body structure of an autonomous vehicle according to the third embodiment of the present invention, and FIG. 9 is an illustrative diagram in a side view showing the overall configuration of the vehicle body structure of the autonomous vehicle.

Here, in the vehicle body structure of the autonomous vehicle in the third embodiment, the same components as those of the vehicle body structure 1 of the autonomous vehicle of the first embodiment will be allotted with the same reference numerals without description.

A vehicle body structure 300 of the autonomous vehicle according to the third embodiment is configured such that a first drive unit 320 and a second drive unit 330 are coupled by an endless belt (endless member) 360, as shown in FIGS. 8 and 9.

The first drive unit 320 includes a drive shaft support box 321 for supporting the drive shaft 7 as shown in FIG. 8. The second drive unit 330 includes an axle support box 331 for supporting the axle 8 as shown in FIG. 8.

Arranged on the drive shaft 7, supported by a so-called double support by the pair of bearings 12 (FIG. 3), of the first drive unit 320 is a first pulley (first endless member driving part) 371 for transmitting drive to an endless belt 360 (FIG. 9). The first pulley 371 is arranged between part (bearing 12: FIG. 3) on the wheel 3 side of the drive shaft 7 and part (bearing 12: FIG. 3) on the drive motor 5 side, inside the drive shaft support box 321.

As shown in FIG. 8, the drive shaft support box 321 is given in a box form, at least, having an opening on the side opposite to the second drive unit 330 so that the endless belt 360 is stretched through the opening from the first pulley 371 to the second drive unit 330 side.

Arranged on the axle 8, supported by a so-called double support by the pair of bearings 12 (FIG. 4), of the second drive unit 330 is a second pulley (second endless member driving part) 372 that is driven by the endless belt 360 to drive the axle 8. The second pulley 372 is arranged between part (bearing 12: FIG. 4) on the wheel 3 side of the axle 8 and part (bearing 12: FIG. 4) on the far side of the wheel, inside the axle support box 331.

As shown in FIG. 8, the axle support box 331 is given in a box form, at least, having an opening on the side opposite to the first drive unit 320 so that the endless belt 360 is extended through the opening from the second pulley 372 to the first drive unit 320 side.

As described above, the vehicle body structure 300 of the autonomous vehicle according to the third embodiment includes the first pulley 371 on the drive shaft 7 of the first drive unit 320 and the second pulley 372 on the axle 8 of the second drive unit 330 and is configured so that the drive shaft 7 of the first drive unit 320 and the axle 8 of the second drive unit 330 are coupled and driven by means of the endless belt 360. Accordingly, if one of the wheels 3 slips, it is possible to gain driving force by the other wheel 3. Further, in performing a so-called skid-steer turn by driving the left and right wheels 3 in the opposite direction, it is possible to set the vehicle's rotating center at the center of the vehicle, hence perform stable turning operation even if the vehicle is heavy and has its center of gravity at a relatively high position.

Since the first pulley 371 and the second pulley 372 are each supported at both sides or by a double support, stable drive transmission can be performed by the endless belt 360.

Since the drive shaft support box 321 and the axle support box 331 are given in the form of a box having an opening through which the endless belt 360 can be conveyed, it is even possible to take out the first pulley 371 and the second pulley 372 together wish the endless belt 360 in performing maintenance.

The Fourth Embodiment

Next, the fourth embodiment of the present invention will be described with reference to the accompanying drawings.

Figure 10:
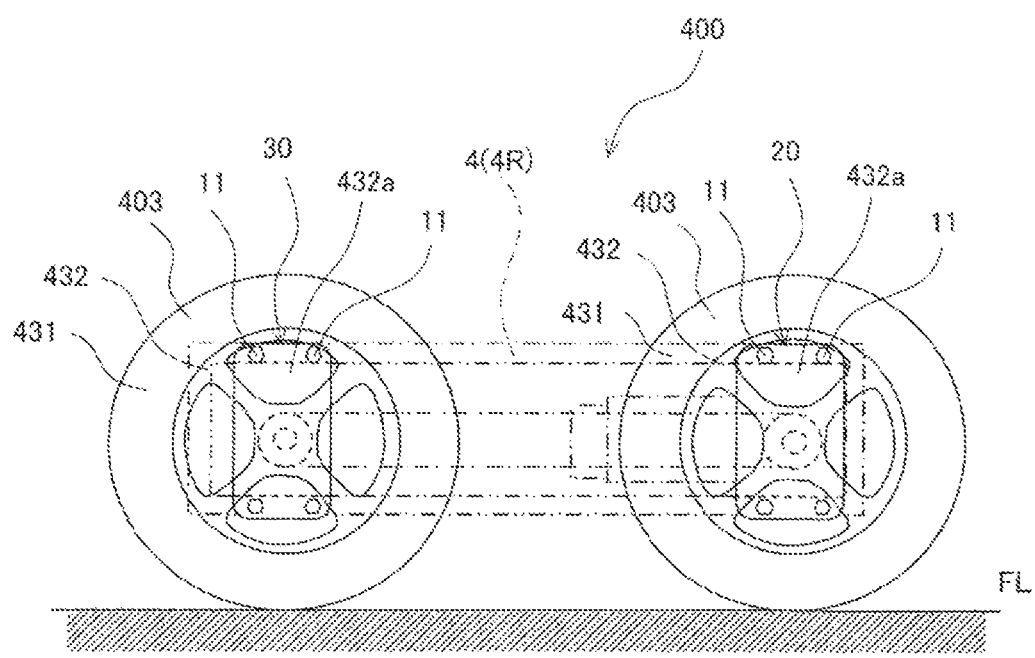
FIG. 10 is an illustrative diagram in a side view showing an overall configuration of a vehicle body structure of an autonomous vehicle according to the fourth embodiment of the present invention.

FIG. 10 is an illustrative diagram in a side view showing an overall configuration of a vehicle body structure of an autonomous vehicle according to the fourth embodiment of the present invention.

Here, in the vehicle body structure of the autonomous vehicle in the fourth embodiment, the same components as those of the vehicle body structure 1 of the autonomous vehicle of the first embodiment will be allotted with the same reference numerals without description.

In a vehicle body structure 400 of the autonomous vehicle according to the fourth embodiment shown in FIG. 10, wheels 403 that are attached to the first drive unit 20 and the second drive unit 30 are constructed such that each wheel 403 is formed of a tireless wheel 432 and a tire 431 mounted thereon, and the wheel 432 is formed with a plurality of openings 432a at positions opposite to fasteners 11 that fix the first or second drive unit 20, 30 to the side frame.

The openings 432a are formed such positions as to allow access to the fasteners 11 for attachment and detachment from the outside when the wheel is positioned at the predetermined position in the state where the wheels 403 is mounted on the first and second driving units 20 and 30.

As constructed above, according to the fourth embodiment, in the vehicle body structure 400 of autonomous vehicle, the tireless wheel 432 of wheel 403 is formed with the plurality of openings 432a at positions opposite to the fasteners 11 for attaching the first drive unit 20 and the second drive unit 30 to the side frame. This arrangement makes it possible to attach and detach the fasteners 11 through the openings 432a, hence it is possible to easily detach the first drive unit 20 and the second drive unit 30 from the side frame 4R/4L without removing the wheels 403.

The Fifth Embodiment

Next, the fifth embodiment of the present invention will be described with reference to the accompanying drawings.

Figure 11:
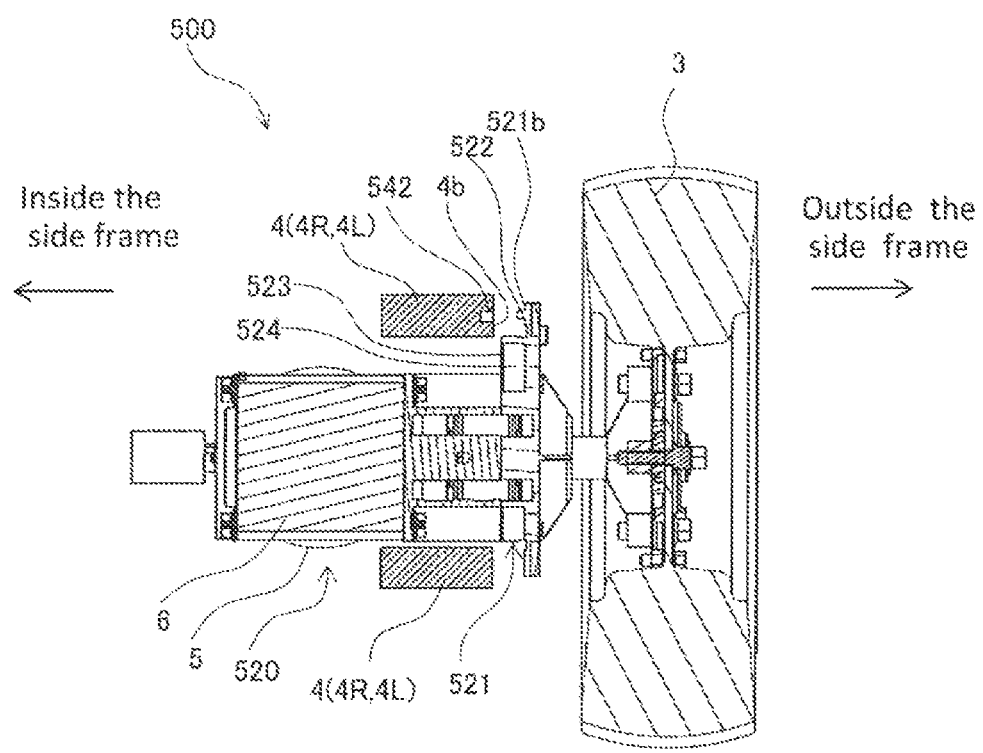
FIG. 11 is an illustrative diagram showing a configuration of a first drive unit that forms a vehicle body structure of an autonomous vehicle according to a fifth embodiment of the present invention.
Figure 12:
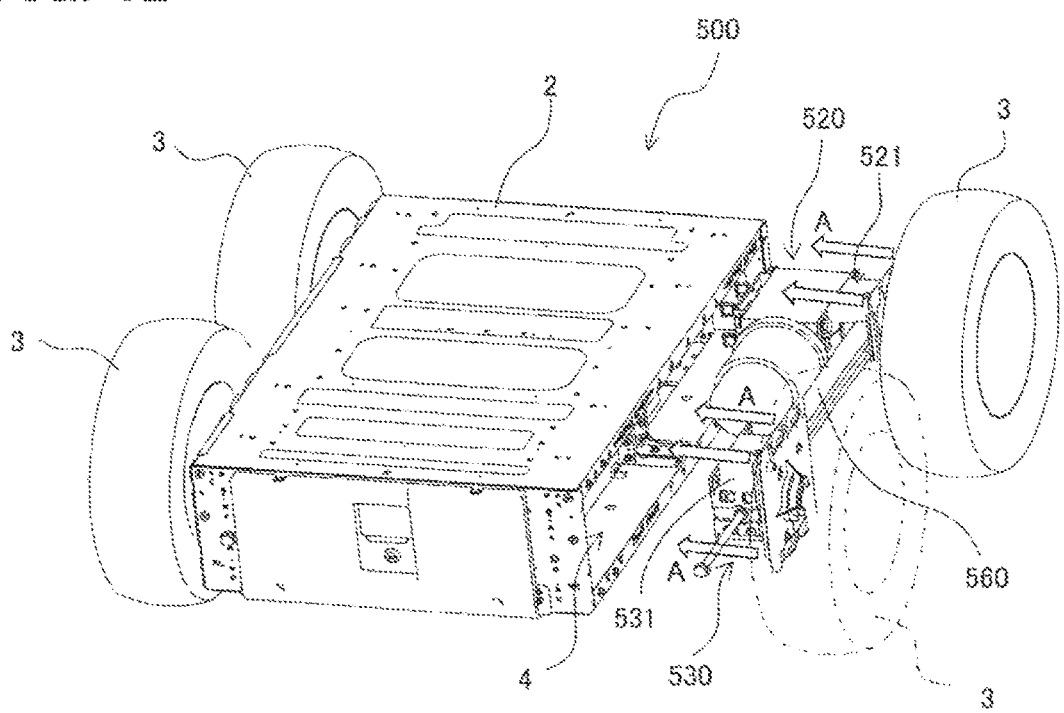
FIG. 12 is an illustrative diagram showing a state in which the first drive unit is assembled from the flank of the side frame.
Figure 13:
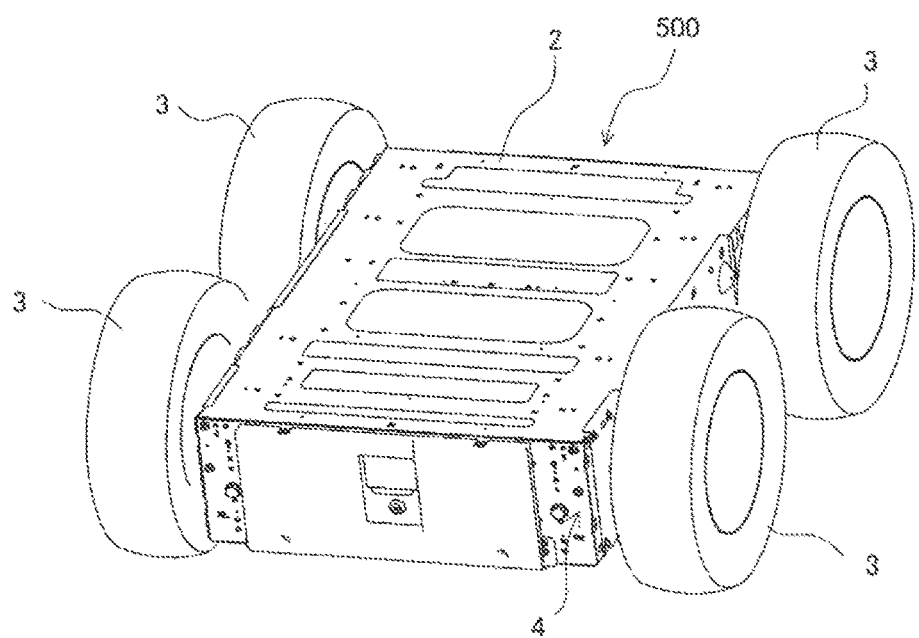
FIG. 13 is an illustrative diagram showing a state in which the first drive unit has been assembled to the side frame; and, FIG. 14 is an illustrative diagram showing the positional relationship between a drive source and a first drive unit that form a vehicle body structure of an autonomous vehicle according to the sixth embodiment of the present invention.

FIG. 11 is an illustrative diagram showing a configuration of a first drive unit that forms a vehicle body structure of an autonomous vehicle according to the fifth embodiment of the present invention, FIG. 12 is an illustrative diagram showing a state in which the first drive unit is assembled from the flank of a subframe, and FIG. 13 is an illustrative diagram showing a state in which the first drive unit has been assembled to the subframe.

Here, in the vehicle body structure of the autonomous vehicle in the fifth embodiment, the same components as those of the vehicle body structure 1 of the autonomous vehicle of the first embodiment will be allotted with the same reference numerals without description.

In a vehicle body structure 500 of the autonomous vehicle according to the fifth embodiment, positioning parts (guide hole 542 and guide pare 522) are provided for the side frame 4 and a first drive unit 520 so that the first drive unit 520 can be positioned relative to the side frame 4, as shown in FIG. 11.

Similarly to the third embodiment, as shown in FIG. 12, the vehicle body structure 500 of the autonomous vehicle is configured so that the first drive unit 520 and a second drive unit 530 are coupled by an endless belt 560.

Arranged on a drive shaft support box 521 of the first drive unit 520 is a first pulley (not shown) for driving the endless belt 560.

Arranged on an axle support box 531 of the second drive unit 530 is a second pulley (not shown) that is driven by the endless belt 560 to turn the axle 8.

The side frame 4 is formed with a guide hole (positioning part) 542 to position the first drive unit 520.

The drive shaft support box 521 of the first drive unit 520 is protectively formed with a guide part (engaging part) 522 mating with the guide hole 542 of the side frame 4.

The guide hole 542 is formed on the second mounting surface 4b of the side frame 4, aiming at placing the first drive unit 520 at the predetermined position on the side frame 4 when the first drive unit 520 is mounted to the side frame 4.

The guide part 522 is formed at a position corresponding to the guide hole 542 in the second attachment part 521b of the drive shaft support box 521.

The drive shaft support box 521 has a hollow grip 524 that is formed on the inner side surface 523 of the chassis in the second attachment part 521b so as to allow fingers to hold.

The grip 524 is formed with a hollowed part that can be hooked by the fingers so that the drive shaft support box 521 can be easily held when the worker handles the heavy first drive unit 520 assembled with the wheel 3, speed reducer 6, drive motor 5 and others.

Now, the assembly work of the first drive unit 520 and second drive unit 530 in the vehicle body structure 500 of the autonomous vehicle of the fifth embodiment will be described with reference to the drawings.

When the first drive unit 520 and second drive unit 530 are mounted to the chassis 2 of the autonomous vehicle, the first derive unit 520 and second drive unit 530 are brought in the direction of arrows A (a width direction of the chassis) in the drawing, and assembled from the outer side of the side frame 4 arranged on each side in the width direction of the chassis 2, as shown in FIG. 12.

During this, the guide part 522 on the first drive unit 520 side is fitted into the guide hole 542 on the side frame 4 side to place the first drive unit 520 at the predetermined position relative to the side frame 4.

Then, the side face of the attachment part 521b of the drive shaft support box 521 is brought into surface contact with the second mounting face 4b on the flank of the side frame 4, and fastened and fixed by fasteners (unillustrated) from the outside of the side frame 4 to complete attachment.

The second drive unit 530 is placed at a predetermined position based on the first drive unit 520 that has been fixed at the predetermined position on the side frame 4, and fastened and fixed from the outside of the side frame 4 in a similar manner to that of the first drive unit 520.

In this way, it is possible to simply attach the first derive unit 520 and the second drive unit 530 to the chassis 2 from the outside of the flank of the side frame 4, as shown in FIG. 13.

According to the fifth embodiment thus constructed as above, the guide hole 542 for positioning the first drive unit 520 is formed in the side frame 4 while the guide part 522 corresponding to the guide hole 542 is protectively formed on the drive shaft support box 521, so that it is possible to simply place the first drive unit 520 at the predetermined position relative to the side frame 4.

Further, since the grip 524 is provided in the second attachment part 521b of the drive shaft support box 521, it is possible to steadily hold the heavy drive shaft support box 521 by holding the grip 524 when the first drive unit 520 is mounted to the side frame 4.

The Sixth Embodiment

Figure 14:
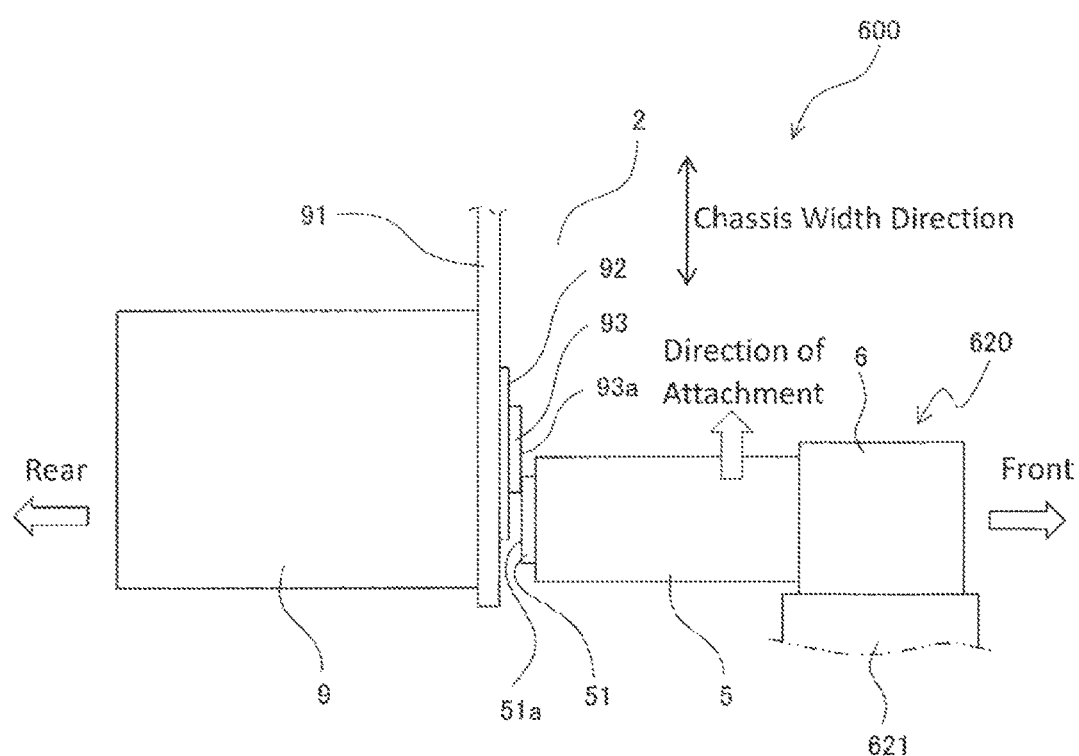

Next, the sixth embodiment of the present invention will be described with reference to the accompanying drawings. FIG. 14 is an illustrative diagram showing the positional relationship between a drive source and a first drive unit that form a vehicle body structure of an autonomous vehicle according to the sixth embodiment of the present invention.

Here, in the vehicle body structure of the autonomous vehicle in the sixth embodiment, the same components as those of the vehicle body structure 1 of the autonomous vehicle of the first embodiment will be allotted with the same reference numerals without description.

In a vehicle body structure 600 of the autonomous vehicle according to the sixth embodiment, a first drive unit 620 includes a drive motor 5 and a speed reducer 6, the drive motor 5 and speed reducer 6 being arranged in the front-to-rear direction.

A battery (power supply unit) 9 is accommodated at the rear side of the drive motor 5 on the chassis 2.

A battery attachment 91 for arranging the battery 9 at a predetermined position is provided at the area where the battery 9 is accommodated.

The battery attachment 91 has a drive controller board (electric connector) 92 that electrically connects the battery 9 and the drive motor 5. The drive controller board 92 is formed with a drive controller electrode portion (power supply side electrode portion) 93 that is connected to the battery 9 and to be connected to the electrode portion on the drive motor 5 side.

The drive motor 5 has a drive motor side electrode portion 51 as an electrode portion to be connected o the drive controller electrode portion 93.

The drive controller electrode portion 93 and the drive motor side electrode portion 51 are arranged so as to connect each other when the surfaces 93a and 51a extending in the chassis width direction are come in surface contact with each other.

When the first drive unit 620 is mounted at the predetermined position of the side frame 4, the drive motor 5 is set in the chassis 2 having the battery 9 mounted thereon, as shown in FIG. 12. In this condition, the drive motor 5 is placed at the predetermined position of the chassis 2 and close to the battery 9 so that the drive controller electrode portion 93 and the drive motor side electrode portion 51 become connected. As a result, the drive motor 5 is ready to receive power from the battery 9.

According to the sixth embodiment thus constructed, the arrangement of the drive motor 5 and speed reducer 6 in front and behind in the front-to-rear direction of the chassis can save space in the width direction of the chassis.

Further, when the first drive unit 520 is set in the predetermined position on she chassis 2 having the battery 9 mounted thereon, the drive motor 5 can be arranged close to the battery 9 at the predetermined position, and the drive controller electrode portion 93 on the battery 9 side and the drive motor side electrode portion 51 come into surface contact with each other. Accordingly, simple and stable connection can be realized without use of any harness.

The present invention should not be limited to the above embodiments and various changes can be made within the range specified in the scope of claims. That is, any embodied mode obtained by combination of technical means modified as appropriate within the scope of claims should be included in the technical range of the present invention.

That is, any embodied mode obtained by combination of technical means modified as appropriate without departing from the spirit and scope of the present invention should be included in the technical range of the present invention.

DESCRIPTION OF REFERENCE NUMERALS 1, 200, 300, 400, 500, 600 vehicle body structure
3 wheel
4, 4R, 4L side frame
5 drive motor (drive unit)
6 speed reducer (drive transmitter)
7 drive shaft 8 axle
9 battery (power supply unit)
11 fastener
20, 220, 320, 520, 620 first drive unit (first driver)
21, 221, 321, 521 drive shaft support box
21a, 31a first attachment part
21b, 31b, 521b second attachment part
30, 230, 330, 530 second drive unit (second driver)
31, 231, 331, 531 axle support box
51 drive motor side electrode portion
91 battery attachment
92 drive controller board (electric connector)
93 drive controller electrode portion (power supply side electrode portion)
240 buffer member
250 rubber bush
360 endless belt (endless member)
371 first pulley (first endless member driving part)
372 second pulley (second endless member driving part)
403 wheel
432 tireless wheel
432a opening
522 guide part (engaging part)
524 grip
542 guide hole (positioning part)

What is claimed is:

1. A vehicle body structure of an autonomous vehicle that travels on wheels attached to a chassis, comprising:
   a first driver integrally configured of a drive portion for driving a first wheel, a drive shaft for driving the first wheel and a first shaft support that rotatably supports the drive shaft;
   a second driver integrally configured of an axle for supporting a second wheel and a second shaft support that rotatably supports the axle;
   a pair of side frames arranged on each side in a width direction of the chassis and each extended in a front-to-rear direction of the chassis to support the first driver and the second driver,
wherein
   the first shaft support and the second shaft support each have an attachment part to be fixed to a flank of the side frame from an outside,
   the first driver is integrally attached to, and detached from, the side frame, by access from the flank of the side frame, and,
   the second driver is integrally attached to, and detached from, the side frame, by access from the flank of the side frame.

2. The vehicle body structure of the autonomous vehicle according to claim 1, wherein at least the first shaft support or the second shaft support is attached to the flank of the side frame by a fastener in a detachable manner so that the attachment part comes in surface contact with the flank of the side frame.

3. The vehicle body structure of the autonomous vehicle according to claim 1, wherein at least the first shaft support or the second shaft support has a top surface opposite to an undersurface of the side frame when mounted to the side frame, the undersurface locating over at least the first shaft support or the second shaft support and,
   at least the first shaft support or the second shaft support having the top surface is placed so that the top surface comes in surface contact with the undersurface of the side frame.

4. The vehicle body structure of the autonomous vehicle according to claim 1, wherein at least the first shaft support or the second shaft support has a top surface opposite to an undersurface of the side frame when mounted to the side frame, the undersurface locating over at least the first shaft support or the second shaft support and,
   a buffer member for inhibiting vibration of the side frame in a vertical direction is arranged between the top surface of at least the first shaft support or the second shaft support and the undersurface of the side frame.

5. The vehicle body structure of the autonomous vehicle according to claim 1, wherein the first shaft support rotatably supports the drive shaft, at least, at two points on an axial line, and
   the second shaft support rotatably supports the axle, at least, at two points on an axial line.

6. The vehicle body structure of the autonomous vehicle according to claim 1, wherein the drive shaft of the first driver and the axle of the second driver are coupled by an endless member,
   the first driver includes a first endless member driving part for transmitting drive to the endless member,
   the second driver includes a second endless member driving part that is driven by the endless member to drive the axle,
   the first endless member driving part is arranged on the drive shaft between part on a first wheel side and part on a drive portion side, and
   the second endless member driving part is arranged on the axle between part on a second wheel side and part on a far side of the second wheel.

7. The vehicle body structure of the autonomous vehicle according to claim 1, wherein the side frame includes a positioning part for positioning the first driver, and
   the first driver includes an engaging part mating with the positioning part.

8. The vehicle body structure of the autonomous vehicle according to claim 1, wherein the shaft support has a hollow grip that is formed on an inner side surface of the chassis.

9. The vehicle body structure of the autonomous vehicle according to claim 1, wherein the drive portion includes a drive motor and a speed reducer,
   the drive motor and the speed reducer are arranged in front and behind in a front-to-rear direction of the chassis.

10. The vehicle body structure of the autonomous vehicle according to claim 9, wherein the chassis has a power supply unit mounted at a predetermined position, and,
   when the first driver is mounted on the chassis, the drive motor is set at a predetermined position adjacent to the power supply unit and electrically connected to the power supply unit so that power is supplied to the drive motor.

11. The vehicle body structure of the autonomous vehicle according to claim 10, wherein the chassis includes an electric connector that electrically connects the power supply unit and the drive motor,
   the electric connector includes a power supply side electrode portion that is connected to the power supply unit and is connected to a drive motor side electrode portion,
   the drive motor includes a drive motor side electrode portion to be connected to the power supply side electrode portion, and,
   the power supply side electrode portion and the drive motor side electrode portion are connected by surface contact of a plane that extends in the width direction of the chassis.

12. A vehicle body structure of an autonomous vehicle that travels on wheels attached to a chassis, comprising:
- a pair of side frames arranged on each side in a width direction of the chassis and each extended in a front-to-rear direction of the chassis;
- a first driver integrally configured of a drive portion for driving a first wheel and a drive shaft for driving the first wheel; and
- a second driver configured to rotatably support an axle for supporting a second wheel, wherein
- the drive shaft and the axle are rotatably supported, at least, at two points on respective axial lines, and
- the first driver and the second driver are integrally attached to, and detached from, the same side frame, by access from a flank of the same side frame.

13. The vehicle body structure of the autonomous vehicle according to claim 12, wherein a buffer member for inhibiting vibration of the side frame in a vertical direction is arranged between a top surface of at least the first driver or the second drive and the side frame.

14. The vehicle body structure of the autonomous vehicle according to claim 12, wherein the drive shaft of the first driver and the axle of the second driver are coupled by an endless member,
- the first driver includes a first endless member driving part for transmitting drive to the endless member,
- the second driver includes a second endless member driving part that is driven by the endless member to drive the axle,
- the first endless member driving part is arranged on the drive shaft between part on a first wheel side and part on a drive portion side, and
- the second endless member driving part is arranged on the axle between part on a second wheel side and part on a far side of the second wheel.

15. A vehicle body structure of a vehicle that travels on wheels attached to a chassis, comprising:
- a driver integrally configured of at least an axle for supporting a wheel and a shaft support that rotatably supports the axle;
- a pair of side frames arranged on each side in a width direction of the chassis and each extended in a front-to-rear direction of the chassis to support the driver, wherein
- the shaft support has an attachment part to be fixed to a flank of the side frame,
- the driver is integrally attached to, and detached from, the side frame, by access from the flank of the side frame.

* * * * *